United States Patent [19]

DiVito et al.

[11] 4,121,094
[45] Oct. 17, 1978

[54] SYSTEM FOR DETECTING, INDICATING AND REGULATING THE LEVEL OF SEMI-SOLID MATTER IN A RESERVOIR

[75] Inventors: Ronald J. DiVito, Arlington Heights; Howard A. Steck, Palatine, both of Ill.

[73] Assignee: Driomi, Inc., Arlington Heights, Ill.

[21] Appl. No.: 769,012

[22] Filed: Feb. 16, 1977

[51] Int. Cl.² ........................... G06M 3/02; G01S 9/66
[52] U.S. Cl. ........................ 235/92 FL; 235/92 CT; 235/92 R; 340/1 L; 417/36
[58] Field of Search ........ 235/92 FL, 92 CT, 92 CA, 235/92 MT; 73/290 V; 340/1 L, 244 R; 417/36

[56] References Cited

U.S. PATENT DOCUMENTS

| 2,746,480 | 5/1956 | Hildyard | 340/1 L |
| 3,486,377 | 12/1969 | Franchi | 340/1 L |
| 3,965,983 | 6/1976 | Watson | 417/36 |
| 4,000,650 | 1/1977 | Snyder | 73/290 V |

Primary Examiner—Joseph M. Thesz
Attorney, Agent, or Firm—John J. Kowalik; Robert H. Heise

[57] ABSTRACT

An electronic system for determining, indicating and regulating the level of semi-solid matter, such as sludge, in a fluid medium. The system produces and directs ultrasonic signals toward the matter, and the reflected signals are used to compute signal transit time and thus indicate incremental sludge levels. An output signal is produced when the matter reaches a preset level, to activate a pump and thus regulate the sludge level.

4 Claims, 4 Drawing Figures

SYSTEM FOR DETECTING, INDICATING AND REGULATING THE LEVEL OF SEMI-SOLID MATTER IN A RESERVOIR

BACKGROUND OF THE INVENTION

Generally, in the storage and removal of semi-solid material from a reservoir or settling tank, it is important to know the extent of material accumulation and to regulate its removal. This is especially true in the field of waste disposal, where it is desirable to sense the level of sludge that accumulates on the bottoms of reservoirs utilized in sewage treatment plants. In most sewage disposal processes sewer effluent is eventually placed in a large tank or reservoir, in order that solid material suspended therein may settle out. When the sludge accumulates to a preset level, a pump is actuated and some sludge is pumped out and the level is thereby reduced. Heretofore, one technique for detecting the sludge level included an "electric-eye" type sensing device. However, such optical systems require continual cleaning to maintain the device operative. Also such a device must necessarily be submerged to a selected depth of operation, which makes cleaning and the regulation of sludge levels a time-consuming operation.

It is therefore a primary object of the present invention to provide a substantially maintenance-free sludge level detecting apparatus.

Another important object of the invention is to provide a system which includes a component submerged just below the surface of the fluid medium.

Still another significant object of the invention is to provide an apparatus which is selectively adjustable to detect a plurality of sludge levels, and to control an output function upon the sensing of a particularly selected sludge level.

Yet another important object of the invention is to provide continual monitoring of the sludge level, together with means for visually displaying the detected level.

SUMMARY OF THE INVENTION

A system for detecting and indicating the level of sludge in a reservoir in accordance with this invention comprises a transducer mounted near the reservoir top. The transducer has an electrical input connection for receiving electrical energy to produce a sonic signal, and is likewise operable to produce an electrical signal in response to receipt of a sonic signal. A transmitter is connected to generate a train of signals at a reference frequency, and these signals are applied over a common electrical connection to the transducer electrical input connection.

THE DRAWINGS

In the several figures of the drawings, like reference numerals identify like components, and in those drawings.

GENERAL BACKGROUND DESCRIPTION

Figure 1:
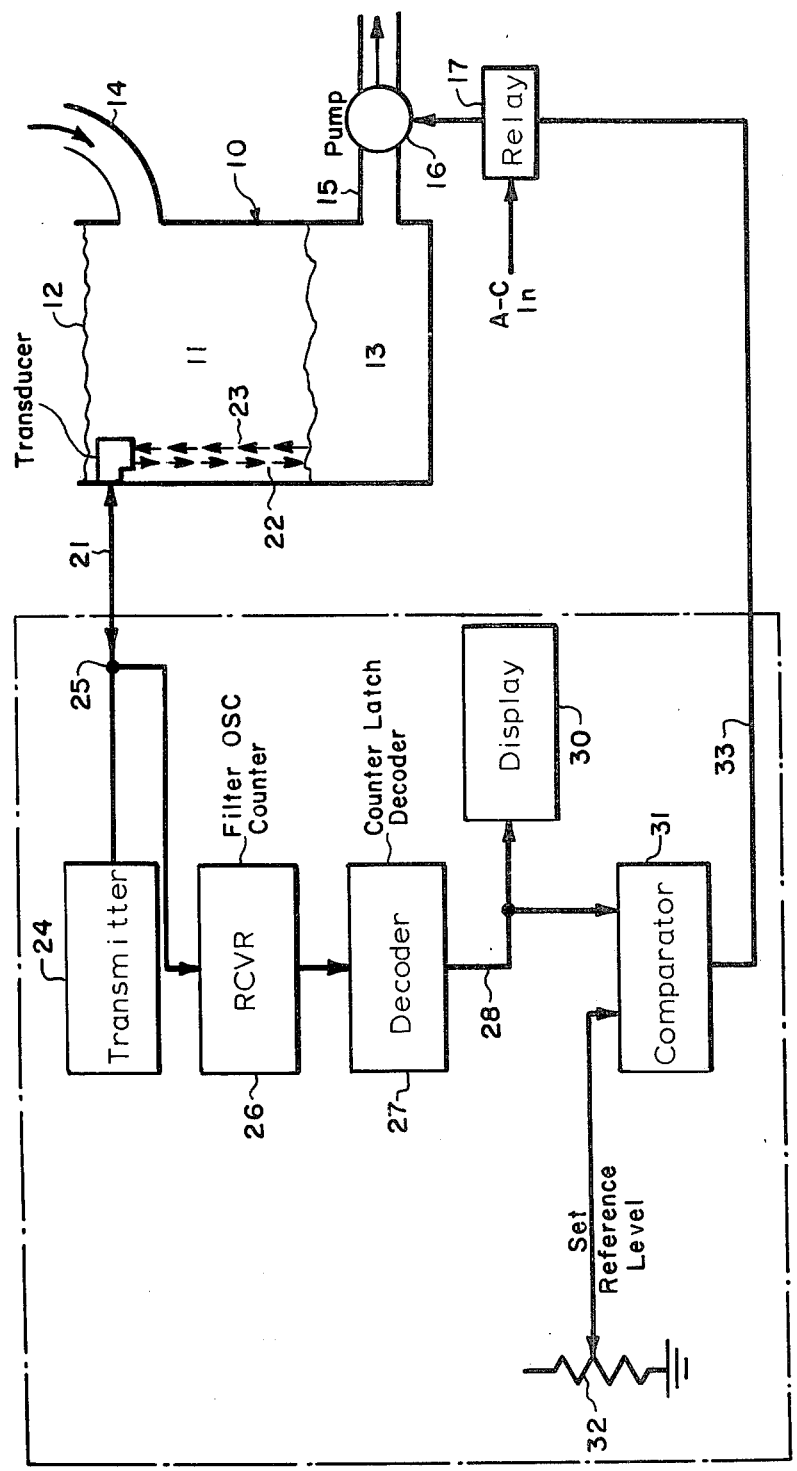
FIG. 1 is a block diagram of major components of the present invention shown in relation to a sludge settling and removal system.

FIG. 1 illustrates the system of this invention for detecting, indicating and regulating the level of sludge in a reservoir 10. As there indicated the upper portion of the reservoir or settling tank 10 is filled with a liquid 11 to an upper surface line 12, and the lower portion of the resrvoir holds the accumulated semi-solid material 13. This semi-solid material or sludge is received through an input channel 14 near the top of the reservoir, and likewise can be discharged through output channel 15 when pump 16 is actuated as a result of operation of relay.

In accordance with one aspect of the present invention, a transducer 20 is mounted near the top of reservoir 10. The transducer includes an electrical input connection, shown as a line 21, for receiving electrical energy to produce a sonic signal from the transducer which is reflected downwardly as represented by the arrows 22 to strike the interface of the semi-solid material 13. Some of this energy is reflected upwardly as represented by the arrows 23, to impinge on the magnetostrictive elements in the transducer, which then converts the received mechanical energy into an electrical signal. Such transducers are now well known and understood in the art.

A transmitter 24 is provided to generate a train of electrical signals at a reference frequency, which signals are applied over a common electrical connection 25 to the electrical input connection 21 of the transducer 20. When the reflected signals provide an output electrical signal from the transducer, they in turn are passed over the input connection 21 and common electrical connection 25 to the input connection of a receiver circuit 26. As will be explained below, the receiver circuit 26 includes a filter for excluding extraneous noise signals and means for discriminating against transient signals within the specified bandwidth. The receiver operates to produce an output signal which is applied to a decoder circuit 27, which in turn provides an information signal on line 28 denoting the level of sludge in the settling tank. A display means 30 is connected to receive the information signal from the decoder and provide a visible indication of the sludge level.

In accordance with another aspect of the invention, a comparator circuit 31 is provided with a first input connection for receiving a reference level signal, shown simply as the output derived from a "set reference level" potentiometer 32. The comparator circuit 31 at its second input connection receives a portion of the information signal from the decoder circuit 27. Accordingly the comparator circuit provides an output signal on line 33 for actuating relay 17 and thus energizing pump 16 when the information signal on line 28 indicates the sludge is above the reference level preset by adjustment of potentiometer 32.

DETAILED DESCRIPTION OF THE INVENTION

Figure 2:
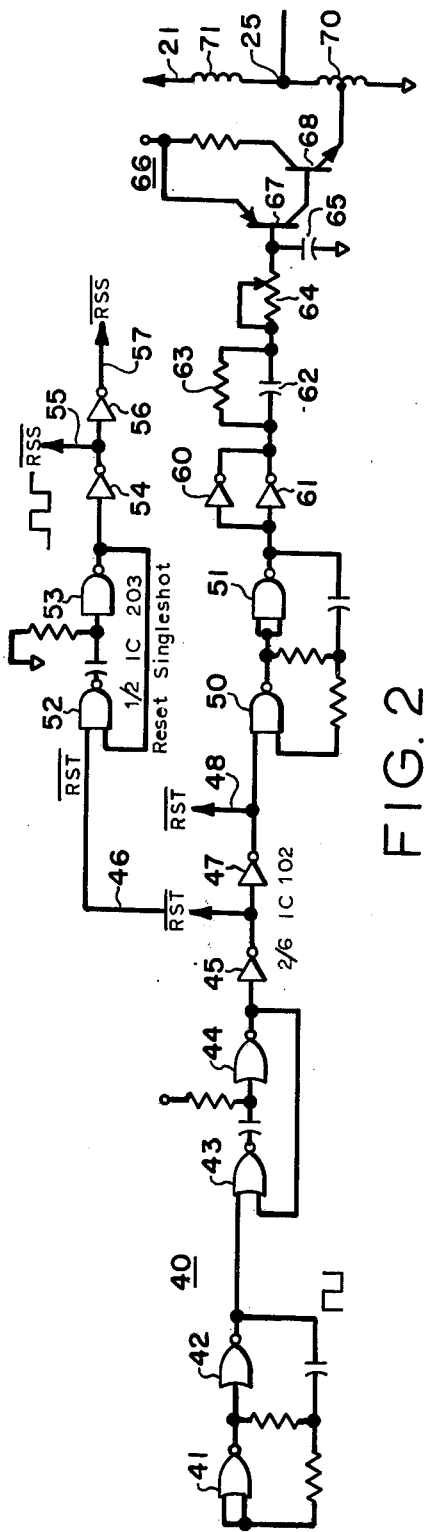
FIG. 2 is a schematic diagram of a transmitter circuit shown more generally in FIG. 1.

FIG. 2 depicts one suitable circuit for implementing the transmitter 24 shown in block form in FIG. 1. At the left side of the transmitter is a first integrated circuit (IC) 40, which includes a first pair of NOR stages 41, 42 connected in an oscillator arrangement for supplying pulses to the succeeding NOR stages 43, 44 connected as a reset circuit. In one embodiment of the invention the oscillator circuit 41, 42 was connected to provide pulses every 1½ seconds, with the reset circuit being provided so that an output pulse of approximately 80 microseconds was delivered each second. The output signal from the reset circuit 43, 44 is passed through a first inverter driver 45 over line 46 and to the input of another inverter driver 47, which provides an output signal on line 48. The signal from inverter driver 47 is also applied to the input side of a 200 kilohertz oscillator comprised of a pair of NAND circuits 50, 51 connected as shown. At the same time that the oscillator 50, 51 is started, a reset single-shot circuit comprised of a pair of NAND circuits 52, 53 is also started as the signal is received over line 46 from the output side of the inverter driver 45. This signal is passed through another inverter driver 54 over an output line 55, and the same signal which appears on line 55 is also passed over an inverter driver 56 to conductor 57. The signals provided on lines 48, 55 and 57 are utilized in conjunction with the circuitry to be described hereinafter, and thus will be explained later.

The output signal from the oscillator 50, 51 is passed over a pair of parallel-coupled inverter drivers 60, 61, a coupling capacitor 62 which has a parallel-connected resistor 63, and over a gain control circuit including a variable resistor 64 and a parallel-coupled capacitor 65 to the input side of the transistor amplifier circuit 66. As shown the amplifier 66 comprises a PNP-type transistor 67 connected so that its collector fees the base of an NPN transistor 68, providing the amplified signal across a portion of a coil 70. This signal is stepped up by autotransformer action and is applied across common electrical connection 25 and inductor 71 to the electrical input connection 21 of the transducer (not shown). It is noted that the common electrical connection 25 represents both the point at which the output signals from the transmitter amplifier are passed to the transducer, and the return point from which the electrical energy supplied from the transducer is applied to the input side of the receiver circuit.

Figure 3:
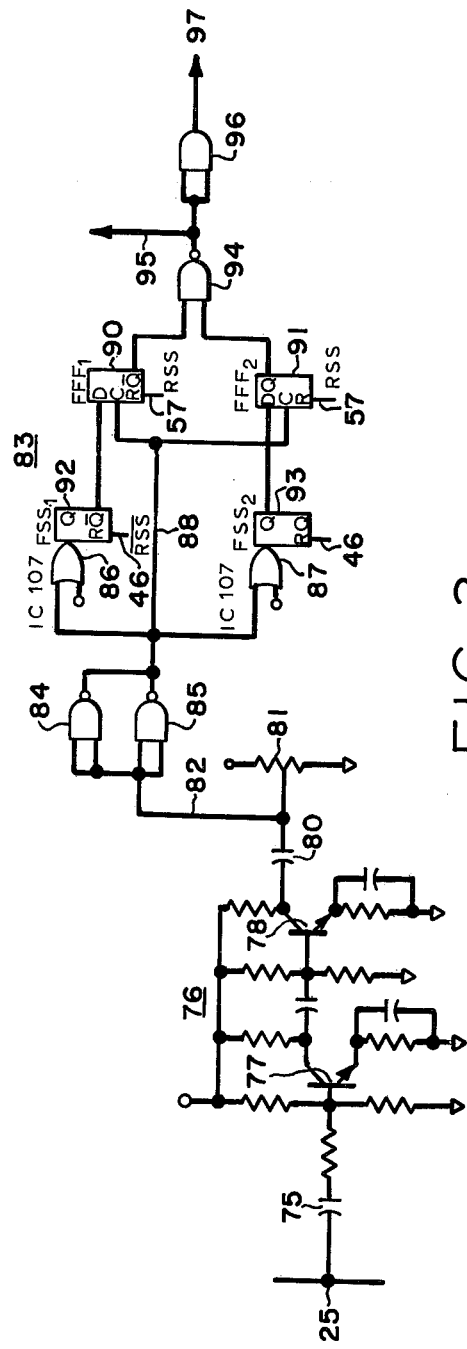
FIGS. 3 and 4 are schematic diagrams depicting the receiver, decoder, display and comparator circuits shown more generally in FIG. 1, together with associated circuitry.

As shown in FIG. 3, the return signals received at the common electrical connection 25 are passed over a coupling capacitor 75 to an input receiver amplifier 76 which includes a pair of NPN type transistors 77, 78 and associated circuit components connected in a conventional arrangement. The amplified return signal is passed over coupling capacitor 80 to the movable arm of a gain control potentiometer 81, so that the effective portion of the output signal from the amplifier is passed over conductor 82 to a filter circuit 83. It should be noted that the illustrated circuit 76 generally corresponds to the receiver circuit 26 shown in block form in FIG. 1, and further that the filter circuit 83 is merely one suitable arrangement for providing an output pulse. Other circuits well known and understood by those skilled in the art can readily be substituted for the illustrated filter arrangement.

Figure 4:
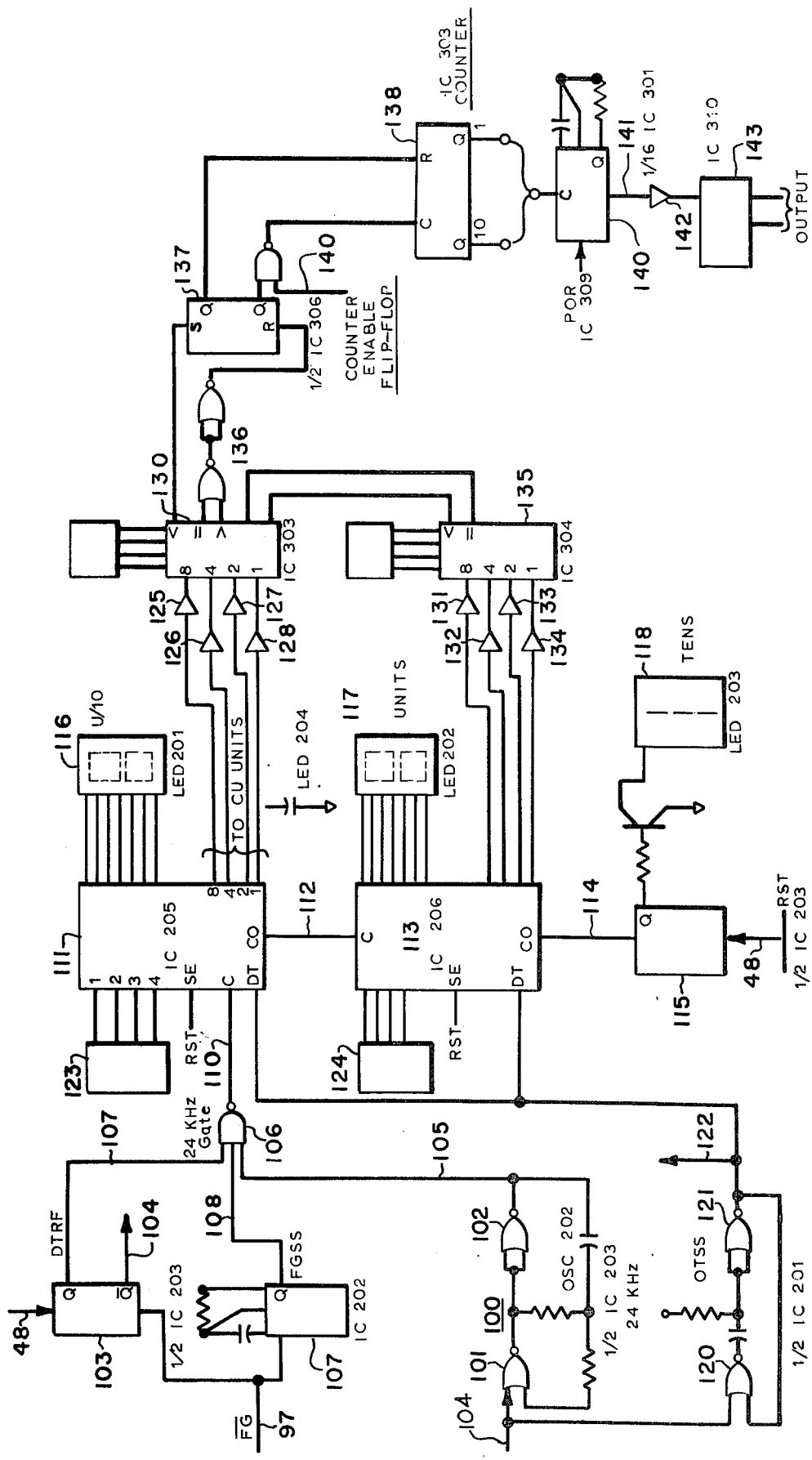

At the input side of the filter, a pair of NAND gates 84, 85 are connected in parallel so their combined output feeds the input connections of a pair of OR gates 86, 87 (connected as amplifiers) and, over line 88, the signal is also applied to the center connection of a pair of flip-flops 90, 91. The respective circuits 86, 87 are individually coupled to the flip-flops 92, 93 as shown, the output signals of which are applied to the input sides of the other flip-flops 90, 91. The flip-flops 92, 93 are reset by the output (RRS) from line 46 of FIG. 2 while the flip-flops 90 and 91 are reset by the output (RRS) from the line 57 of that figure. The output signals from the flip-flops 90, 91 in the filter circuit are applied to a NAND circuit 94, the output signal of which is applied both to an output conductor 95, and over a NAND circuit 96 and conductor 97 to the input side of a data transfer circuit 100 as shown in FIG. 4. It should be emphasized that the output signal is only provided on line 97 when a true return signal is received at the transducer. Filter 83 blocks noise or spurious signals which might otherwise cause an erroneous output signal at conductor 97. When a true echo return from the semi-solid matter in the reservoir is received at the transducer, the output signals are provided on conductors 95 and 97 from the filter circuit as shown.

At the left side of FIG. 4 is a 24 kilohertz oscillator circuit 100 comprised of the IC stages 101 and 102 connected as shown. The auxiliary oscillator 100 was started when the ultrasonic signal was first transmitted into the water. This was established by the signal on line 48 (FIG. 2) which is applied to the data transfer flip-flop circuit 103 (FIG. 4), to reset this stage and provide an output signal on line 104 which is also applied to one side of the auxiliary oscillator 100. Thus a train of pulses is established on line 105 as the 24 kilohertz oscillator 100 runs during the time interval in which the ultrasonic signal passes downwardly from the transducer, strikes the semi-solid matter and is reflected upwardly to again strike the transducer. This train of signals is established at one input of the 24 kilohertz gate circuit 106, which is receiving the pulses over line 105 after the gate is in effect opened by receipt of the signal over line 107 from the data transfer flip-flop 103. This train of counting signals continues to arrive at the gate circuit 106 and is passed therethrough until an output signal from the filter appears on line 97. This signal is passed through the filter gate single-shot 107 to provide an output signal on line 108 which closes the gate 106 and terminates transmission of the timing pulses from the stage 106 over line 110 to the counter circuit 111. The upper counter circuit 111 includes one output connection 112 which passes signals to its associated counter circuit 113, which likewise passes signals over line 114 to the stage 115. The stage 115 determines whether the "tens" (or third) digit in a three-digit display having tens, units and tenths will be illuminated. Those skilled in the art will readily understand how the individual light-emitting diode arrays 116, 117 and 118 can be coupled to the stages 111, 113 and 115 as shown to provide a visual indication of the sludge level as determined by the operation of the system as just described. It is also noted that the data-transfer single-shot stage including the two circuits 120, 121 are connected as shown to provide an output reset signal on line 122 whenever the data transfer flip-flop 103 is reset.

In accordance with another aspect of the invention, some means for establishing a "set reference signal" is provided, as represented generally by the adjustable potentiometer 32 in FIG. 1. Instead of a potentiometer, those skilled in the art will readily appreciate that a pair of thumbwheel switches 123, 124 can be connected as shown to apply an input signal to the respective counter stages 111, 113 to indicate the desired level of sludge accumulation within the reservoir. That is, the thumbwheel units or other adjustable switches can be employed to establish a level above which some corrective operation, such as pumping out excess sludge, will be initiated. To accomplish this the output from the IC stage 111 is passed over the inverter amplifiers 125, 126, 127 and 128 as shown to a first comparator stage 130, and the output signal from the other IC counter stage 113 is passed over similar inverter amplifiers 131, 132, 133 and 134 to a second comparator stage 135. Stages 130 and 135 are integrated circuits of the type which provide one of three output signals, connoting whether the compared input signals are equal to, greater than, or less than the reference signal established by the setting of the thumbwheel switches 123, 124. When the comparator circuit 130, 135 provides an output signal indicating that the preset or reference level has been exceeded by the accumulation of sludge, a signal is passed through the single-shot circuit 136 to the reset connection of the safety-counter flip-flop 137. This circuit is used in conjunction with the safety-counter 138 to insure that spurious signals do not inadvertently trigger a control operation. That is, each time a true signal is passed by the filter 83, the data transfer circuit single-shot 120, 121 provides an output signal on line 122 which is passed through the timer circuit 140 to an input connection of the safety-counter 138. In the preferred embodiment the counter was set so that a total of four consecutive outputs must be received, as determined in part by the adjustment of the variable time circuit 140, to produce a single output or control signal on line 141. This insures that a random or bounce echo from some stray particulate matter suspended in the liquid does not provide a false echo which might energize the pump and begin to remove the sludge from the reservoir before the accumulation reached the preset level. The output signal from the adjustable timer 140 (last portion of the guard circuit) is then passed through an inverter amplifier 142 and an output switching circuit 143 to actuate the relay shown generally in FIG. 1 to provide the requisite control operation.

While only a particular embodiment of the invention has been described and illustrated, it is apparent that various modifications and alterations may be made therein. It is therefore the intention in the appended claims to cover all such modifications and alterations as may fall with the true spirit and scope of the invention.

What is claimed is:

1. A system for detecting and indicating the level of sludge in a reservoir, comprising;
    a transducer mounted near the top of said reservoir, including an electrical input connection for receiving electrical energy to produce a sonic signal, and likewise operable to produce an electrical signal in response to the receipt of a sonic signal;
    a transmitter, connected to generate a train of signals at a reference frequency and apply the reference signals over a common electrical connection to the electrical input connection of the transducer;
    a receiver circuit having an input connection coupled to the common electrical connection, for providing an output signal responsive to receipt of an electrical signal from the transducer;
    a decoder circuit, connected to receive the receiver output signal and provide an information signal denoting the level of sludge in the reservoir; and
    display means, connected to receive the information signal from the decoder and to provide a visible indication of the sludge level;
    an outlet conduit near the bottom of said reservoir, and a pump positioned in connected with said conduit to discharge sludge from the reservoir when the pump is energized;
    a comparator circuit having first and second input connections, and having an output circuit for regulating energization of the pump;
    means for establishing a reference level signal at the first input connection of the comparator circuit; and
    means for applying the information signal from the decoder circuit to the second input connection of the comparator circuit, such that the comparator circuit output operates to energize the pump when the information signal indicates a sludge level about the reference level.

2. A system as claimed in claim 1, and further comprising:
    a filter, coupled between the receiver circuit and the decoder circuit, operative to pass signals only within a frequency range determined by the filter circuit itself.

3. A system as claimed in claim 1, and further comprising:
    an auxiliary oscillator circuit coupled in said decoder circuit, and connected to be started upon operation of the transmitter to send a pulse to the transducer, and to have its operation terminated when an echo pulse is returned from the transducer to the receiver, such that the total number of pulses generated by the auxiliary oscillator during this interval is a function of the sludge level in the reservoir.

4. A system as claimed in claim 1, and further comprising:
    pump energizer means coupled to said pump and operative to energize and de-energize said pump; and
    a guard circuit, coupled between the comparator circuit and the pump energizer means, operative to effect actuation of the pump only after a pre-determined number of consecutive return signals have been received from the transducer.

* * * * *